(12) United States Patent
Vatne

(10) Patent No.: US 9,945,321 B2
(45) Date of Patent: Apr. 17, 2018

(54) HOT GAS ENGINE

(71) Applicant: DULOB AB, Anderstorp (SE)

(72) Inventor: Kaare Vatne, Karlstad (SE)

(73) Assignee: DULOB AB, Anderstorp (SE)

( * ) Notice: Subject to any disclaimer, the term of this patent is extended or adjusted under 35 U.S.C. 154(b) by 223 days.

(21) Appl. No.: 14/443,889

(22) PCT Filed: Nov. 20, 2013

(86) PCT No.: PCT/SE2013/051373
§ 371 (c)(1),
(2) Date: May 19, 2015

(87) PCT Pub. No.: WO2014/081381
PCT Pub. Date: May 30, 2014

(65) Prior Publication Data
US 2015/0285183 A1 Oct. 8, 2015

(30) Foreign Application Priority Data

Nov. 20, 2012 (SE) .................................... 1230127-1

(51) Int. Cl.
*F02G 1/044* (2006.01)
*F02G 1/02* (2006.01)
(Continued)

(52) U.S. Cl.
CPC .............. *F02G 1/044* (2013.01); *F02G 1/02* (2013.01); *F02G 1/053* (2013.01); *F16H 21/365* (2013.01);
(Continued)

(58) Field of Classification Search
CPC ........ F01B 17/00; F01B 17/02; F01B 17/022; F01B 29/08; F01B 29/10; F02G 2270/85;
(Continued)

(56) References Cited

U.S. PATENT DOCUMENTS

| 1,926,463 A | 9/1933 | Stoddard |
| 2,067,453 A | 1/1937 | Royal |

(Continued)

FOREIGN PATENT DOCUMENTS

| CA | 2 213 044 A | 4/1997 |
| DE | 2 204 763 A | 2/1972 |

(Continued)

OTHER PUBLICATIONS

International Search Report, dated Mar. 10, 2014, from corresponding PCT application.

*Primary Examiner* — Mark Laurenzi
*Assistant Examiner* — Mickey France
(74) *Attorney, Agent, or Firm* — Young & Thompson

(57) ABSTRACT

The engine includes a first and a second cylinder chamber. The first chamber receives gas through a first inlet valve which gas will be compressed by a piston in the cylinder and will leave the first chamber through a first outlet valve. The second chamber receives compressed gas from the first chamber through a second inlet valve. The gas expands in the second chamber while performing a work on the piston before leaving the second chamber through a second outlet valve. The engine is controlled such that gas will flow from the first to the second chamber while the engine performs a working cycle and the engine is thus controlled such that a piston is used for compressing gas which performs a work on the same piston, which is connected by a rod to a cranking mechanism to transfer work from the rod by an essentially only rectilinear movement.

20 Claims, 10 Drawing Sheets

(51) Int. Cl.
*F02G 1/053* (2006.01)
*F16H 21/36* (2006.01)

(52) U.S. Cl.
CPC ...... *F02G 2270/40* (2013.01); *F02G 2270/45* (2013.01); *F02G 2270/50* (2013.01); *F02G 2270/85* (2013.01)

(58) Field of Classification Search
CPC ... F02G 1/044; F02G 1/00; F02G 1/02; F02G 1/04; F02G 1/043; F02G 1/0435; F02G 1/045; F02G 1/047; F02G 1/05; F02G 1/06; F02G 1/053
USPC ......... 60/682, 684, 516, 517, 521, 522, 523, 60/524, 525, 526, 650, 645, 508–515
See application file for complete search history.

(56) References Cited

U.S. PATENT DOCUMENTS

| | | | |
|---|---|---|---|
| 2,166,975 A | 7/1939 | Perez | |
| 2,685,173 A | 8/1954 | Percival | |
| 3,138,918 A | 6/1964 | Baker | |
| 3,667,215 A * | 6/1972 | Rao | F01K 27/00 60/526 |
| 3,879,945 A | 4/1975 | Summers | |
| 4,077,221 A | 3/1978 | Maeda | |
| 4,928,658 A * | 5/1990 | Ferrenberg | F02B 75/02 123/543 |
| 5,467,600 A * | 11/1995 | Kuroiwa | F02G 1/04 417/399 |
| 6,672,063 B1 | 1/2004 | Proeschel | |
| 2005/0188692 A1* | 9/2005 | Clucas | F02G 1/055 60/517 |
| 2006/0218919 A1 | 10/2006 | Mitani et al. | |
| 2009/0165461 A1* | 7/2009 | Klassen | F03G 6/00 60/682 |
| 2011/0225966 A1* | 9/2011 | Chae | F25B 9/14 60/517 |

FOREIGN PATENT DOCUMENTS

| | | |
|---|---|---|
| DE | 23 36 105 A | 7/1973 |
| DE | 3315493 A1 | 10/1984 |
| DE | 102005053857 A1 | 5/2007 |
| DE | 102006039924 A1 | 3/2008 |
| EP | 0 708 274 A1 | 4/1996 |
| GB | 127 686 A | 5/1919 |
| JP | S62182442 A | 8/1987 |
| JP | 2011/038508 A | 2/2011 |
| WO | 85/01988 A1 | 5/1985 |
| WO | 2005-075801 A1 | 8/2005 |

* cited by examiner

HOT GAS ENGINE

TECHNICAL FIELD

The present invention relates to a dual cylinder chamber engine, e.g. a hot gas engine or heat engine. The purpose of a heat engine is in general to convert heat into useful mechanical work as efficiently as possible. The mechanical energy may for example be used for the production of electricity.

BACKGROUND OF THE INVENTION

According to the laws of thermodynamics, the heat equivalent of the mechanical work produced is the difference between the heat supplied to the system and the heat leaving the system at the end of its thermodynamic cycle. For maximum efficiency, the mechanical work generated must be as high as possible and the thermo efficiency of the system is therefore given by the formula, Efficiency=(Q1−Q2)/Q1 where Q1 is the heat supplied and Q2 is the heat leaving the system. This equation can then be written in the form Thermal Efficiency=(1−Q2/Q1).

Engines where heat is added by conduction through an external heat exchanger normally works on the Stirling cycle, which was invented by Robert Stirling in 1816. These engines work on the principle of having a given mass of gas inside a closed chamber with a displacer piston offset in a cyclic motion from the main power piston. The displacer piston pushes the air alternatively between a hot source, where heat is added thus increasing temperature and pressure and a cold sink where heat is removed by cooling thereby reducing temperature and pressure. The power piston is thereby driven by a pulsating pressure wave. The advantage of these engines being the freedom to operate by any type of fuel, it's complete freedom from toxic emissions and quiet operations and has been the preferred prime mover in Combined Heat and Power (CHP) applications.

In heat engines producing mechanical work only, the heat leaving the system is wasted, and the efficiency of mechanical work produced is therefore the only measure of fuel efficiency which should produce mechanical work with the minimum of fuel consumed.

In the fast growing and increasingly important segment of CHP for domestic and other application, the heat leaving the system can be used to heat domestic hot water and heating and therefore makes better use of the total energy supplied and can typically achieve total efficiencies of 80-90% of the heat supplied. Typically, the electric power demand for a domestic CHP unit is between 3-5 kW of power and be expected to operate continuously, with normal service demands only, for a minimum period of 5 years.

Heat engines which are based on the above described principle may for example be found in U.S. Pat. No. 6,672,063; U.S. Pat. No. 1,926,463; DE 23 36 105; DE 10 2006 039 924; GB 127,686; US 2006/218 919; DE 10 2005 053 857; U.S. Pat. No. 4,077,221; U.S. Pat. No. 3,879,945; JP 2011-038 508 and DE 2 204 763.

It is further known to use dual cylinder chamber engines in which a gas flow is directed first through a first chamber defined at a first end of the cylinder where after the gas is directed to a second chamber defined at the other end of the cylinder wherein heat is added to the gas flow in a heater outside the cylinder. This is for example shown in U.S. Pat. No. 2,067,453; U.S. Pat. No. 2,685,173 and U.S. Pat. No. 3,138,918.

Even though the above described systems describes working examples of suitable engines and control methods using the Stirling cycle, there is still a desire for improvements in the constructional details of the engine in order to reduce losses and optimize the engine performance while also providing an engine which may work continuously for a long period with low wear of the components.

DISCLOSURE OF INVENTION

Conventional engines, whether of the internal combustion type or the external combustion Stirling type, when running at peak power for extended periods of time will because of its high peak internal pressures of 40-100 bar will typically achieve operating life in the region of 5.000-10.000 hours. This is insufficient to generate a sound investment with an expected commercial life of 5 years.

Engines being used are either of the internal combustion type, divided up in engines operating on the constant combustion pressure, such as gas turbines or diesel engines, engines working on the Otto constant volume cycle or the external combustion type based on the Stirling principle. However, the basic principles of how the external combustion engines and internal combustion engines may be used and controlled, with their benefits and drawbacks, are generally considered to be so different that they are hardly considered to be relevant due to their constructional differences.

The present invention is thus directed to the use of external combustion engines, or maybe more accurately described, hot gas engines having an external heat source since there is not necessarily needed a combustion process to be used as a heat source but could be any suitable means for heating the gas working in the hot gas engine. However, a suitable fuel to be used is gaseous methane.

A purpose of the present invention is directed to the use of a heat engine in order to provide an engine which may produce electricity and heat in relatively small amounts. The purpose of these kinds of engines may for example be to provide electricity and heat for a small entity. For this purpose it is desirable to provide a small engine which is easy to install and may be moved easily. A further object of the invention is to provide an engine which may produce electricity and heat in relatively large amounts, e.g. an output of 100 kW or more. For this purpose it is desirable to provide a relatively large, stationary engine for an efficient energy production of heat and electricity.

In order to provide an engine which may last for long time it is desired to provide an engine which may work at relative low pressures and temperatures. The present invention aims thus to provide an engine working with low pressure and temperatures and still provide an efficient energy production of heat and electricity. The engine according to the invention is for example suitable to operate under a fixed set of conditions such as constant speed of 3000 rpm, which is ideal to produce AC electric power with 50 hertz cycle, and to provide electric power for hybrid applications and other applications where speed control is not essential. It is intended to operate at fairly low pressures, 6-10 bar peak pressure and temperatures below 700 degrees C. which gives low load on bearings and sliding parts and thereby provides the potential for service life to be in the region of 50-80 000 operating hours or more.

Hence, the invention relates to a hot gas engine comprising a cylinder extending in a longitudinal direction. The cylinder has a first end and a second end in the longitudinal direction. The cylinder is further provided with inlet and outlet openings for a working fluid to enter into and to be exhausted from the cylinder. The engine may thus be a single cylinder engine but there may of course also be several cylinders connected together to provide a multi cylinder engine.

The engine further comprises a piston located within the cylinder. The piston is adapted to be able to move back and forth within the cylinder in the longitudinal direction while the working fluid is compressed and expanded during engine work. The piston has a first surface facing the first end of the cylinder such that a first cylinder chamber is defined by the first cylinder end, the first piston surface and the cylinder wall along the longitudinal side of the cylinder. The piston further has a second surface facing the second end of the cylinder such that a second cylinder chamber is defined by the second cylinder end, the second piston surface and the cylinder wall along the longitudinal side of the cylinder. Hence, the cylinder spaces are thus arranged such that when one cylinder chamber volume is decreased as the piston moves in the longitudinal direction within the cylinder is the other cylinder chamber volume increased.

The engine also comprises a piston rod having a first end and a second. The first end of the piston rod is connected to the piston and the piston rod is arranged to pass through either the first or second end of the cylinder. The second end of the cylinder is connected to a mechanical arrangement in order to produce useful work, e.g. for the production of electricity.

The hot gas engine has a particular design of its cylinder and the arrangement of the inlets and outlets to the cylinder. The cylinder is designed such that the first cylinder chamber comprises a first inlet opening provided with a first inlet valve and a first outlet opening provided with a first outlet valve. These openings may be provided in the wall at the first end. The cylinder is further designed such that the second cylinder chamber comprises a second inlet opening provided with a second inlet valve and a second outlet opening provided with a second outlet valve. Similar to the arrangement of the openings in the first cylinder chamber may these openings be provided in the end wall, in this case at the second longitudinal end of the cylinder. Hence, the engine is arranged such that a working fluid may enter and be discarded from both the first and second cylinder chamber. Hence, the engine may work such that either chamber may be used for producing a work on the piston by an expanding gas or provide a work from the piston on the gas to compress it.

The openings in the cylinder are arranged such that the first outlet opening in the first cylinder space is connected to the second inlet opening in the second cylinder chamber so as to allow a flow of working gas from the first cylinder chamber to the second cylinder chamber. The first inlet opening in the first cylinder chamber is thus used as an intake opening for the gas which will be used as a working medium in the engine and the second outlet opening in the second cylinder chamber will thus serve as an exhaust for the gas when it has been used as a working media in the engine.

The invention is as previously described in particular directed to an engine which will be able to work efficiently at rather low pressures. In order to be able to reduce energy losses it has been revealed during research work that there is a desire to provide a cranking mechanism which may allow the piston rod to move essentially rectilinearly (or translationally) such that the friction of the piston moving inside the cylinder is reduced. The less the angular movement of the piston rod is, the more may the friction losses from the motion of the piston be reduced. The cranking mechanism is preferably made such that the bending angle between the extreme positions is less than 5 degrees, preferably less than 2 degrees and most preferably less than 1 degree. Hence, it is desired an arrangement which is designed to make the piston perform a rectilinear movement up and down without any rotational movement.

One such arrangement suitable for the engine is a so called orbital cranking mechanism. The hot gas engine may thus be designed such that the piston rod is connected at its second end to an orbital crankshaft. The orbital crankshaft has a first inner gearwheel and a second outer gearwheel such that the inner gearwheel will rotate one round when travelling half the round on the inner side of the outer gearwheel. The piston rod is attached to the gear wheel by a pivotal connection at an attachment point of the first inner gear wheel such that the piston rod will perform a linear motion while moving back and forth. An example of such an arrangement may for example be found in CA 2,213,044. This mechanical mechanism for transferring power from a reciprocally moving piston to provide a rotating motion is particularly suitable in the present hot gas engine since it will reduce the forces perpendicular to the linear movement of the piston. The present engine is intended to work with relative low pressures thus having a relative small engine output as compared to for example internal combustion engines used in cars. It is therefore of great interest to reduce friction losses since friction forces may be of great disadvantage in reaching a high efficiency engine. This arrangement is particularly suitable for this engine since the relative low forces make it possible to use this arrangement with low wear of the gearwheels of the gear wheel arrangement.

It is further an advantage to use this orbital cranking mechanism for a dual cylinder chamber engine in which the resulting force from the piston corresponds to the differential pressure from the two chambers of the dual cylinder chamber engine. By selecting the opening and closing of the valves of the engine appropriately could a rather constant force from the orbital cranking mechanism be achieved. The orbital cranking mechanism has certain benefits in view of the normally used cranking mechanisms in order to transmit a reciprocating motion driving a piston up and down. The normally used crankshaft acting over a crank mechanism suffers from the inherent problem that the speed of the piston going upwards is different from the speed of the piston going downwards due to the crankshaft error being proportional to the ratio between the length of the crankshaft and the crank radius according to the following formula $$X = r*(1-\cos(\alpha) \pm Q*\sin^2 \alpha)$$

where X is the length of piston travel, r is the crankshaft radius, Q is the ratio between the length of the crankshaft and the crank radius and α being the angle of rotation from the top dead point. The + is used when the piston travels from top to bottom and the – is used when the piston travels from bottom upwards.

This error is causing losses in the recovery of mass forces since the mass forces will not be the same when the piston accelerates on the start of its motion as opposed to when it decelerates at the end of its motion.

The orbital drive mechanism shown in this invention gives a pure sinusoidal motion which is harmonic and where all mass forces are being recovered in a perfect manner as will be further explained in the detailed description. The tangential forces creating torque are equally pure sinusoidal and harmonic and the efficiency of the transmitted torque is significantly better than a conventional crank mechanism.

The previously known orbital mechanisms suffers from the problem that the length of the radius creating torque is only half of the crank radius in a normal crank mechanism therefore causing twice the bearing force on the central pinion of the planetary wheel transmitting the motion. In a conventional combustion engine where the peak pressure acting on the piston is very high, the forces transmitted to the central pinion would render the mechanism unusable for this purpose.

Using the dual cylinder chamber engine together with the orbital cranking mechanism provides a synergetic combination. The dual cylinder chamber engine allows compression of the gas and expansion of the heated gas to take place during the same 180 degrees motion of the piston with a resulting peak pressure, and thus the force from the piston rod, being by comparison very small. The only forces transmitted from the piston through the orbital drive mechanism is the differential force between the force acting on the top of the piston less the force acting on the bottom of the piston, i.e. the pressure differential between the chambers. This again creates significantly less force on the bearings and a more uniform torque transmission. With the complete absence of side forces creating friction this makes it possible to extract a high mechanical efficiency from the invention despite its low pressure characteristics. Hence, to combine the orbital cranking mechanism with the dual cylinder chamber concept will enable a low pressure, energy efficient engine for producing electricity and heat. To be noted, the rather low pressures will contribute to make possible to use the orbital cranking mechanism with less wear such that the conceptual engine may last for several years. An obstacle for being able to use the orbital cranking mechanism successfully in commercial aspects has been difficulties in providing a design which may work satisfactorily under normal pressures for internal combustion engines. Hence, this concept will enable the use of the orbital cranking mechanism to be efficient commercially while on the other hand also being of great importance for managing to build an energy efficient engine.

As a power source, the engine is preferably connected to an external heating chamber. The heating chamber is connected by conduits to the cylinder in order to allow a flow of a working fluid between the heating chamber and the cylinder. The openings in the cylinder are arranged such that the first outlet opening in the first cylinder space is connected to a third inlet opening in the heating chamber in order to enable a flow of a gas from the first cylinder chamber to the heating chamber. In order to provide a through flow in the heating chamber is a third outlet opening in the heating chamber connected to the second inlet opening in the second cylinder chamber so as to allow a flow of working gas from the heating chamber to the second cylinder chamber. Hence, a flow path is provided from the first cylinder chamber to the second cylinder via the heating chamber.

The external heating chamber may be provided with a burner. The burner may be used to directly heat the gases by combusting a fuel in the heating chamber which thereafter forms part of the flow thorough the engine. Hence, the combustion products will in this case form part of gaseous working flow through the cylinder or cylinders.

Another way of heating the gaseous working flow is to provide the heating chamber with a heat exchanger. The heat exchanger may be connected to a heat source outside the heating chamber producing a heat flow passing through the heat exchanger in order to heat the gaseous working flow of the engine. However, also a burner inside the heating chamber could be used to provide the heat needed for the heat exchanger in order to heat the gaseous working flow by heat exchanging with the gases passing through the heating chamber.

The hot gas engine may further be designed such that the above mentioned valves are controlled to enable a particular working cycle. According to one embodiment is the engine arranged to control the valves during the major part of the first stroke, during which the piston travels from the first end of the cylinder to the second end of the cylinder, such that The first inlet valve in the first inlet opening in the first piston chamber and the second outlet valve in the second outlet opening in the second cylinder chamber are open, and The first outlet valve in in the first outlet opening in the first cylinder chamber and the second inlet valve in the second inlet opening in the second cylinder chamber are closed.

This means that there will be an intake of working gas to the first chamber through the first inlet opening to be used in the engine while gas which already has been used as a working fluid in the engine will be exhausted through the second outlet opening in the second chamber. The closing of the first outlet valve and the second inlet valve means that the working gas will stop to flow through the heating chamber and provide for a constant volume heating of the gas comprised in the heating chamber while essentially no work is performed on or by the piston.

It is indicated that the engine is designed to control the valves to these positions during the major part of the first stroke. In theory, it is estimated that the best performance will be achieved if the first inlet opening valve and the second outlet opening valve are opened exactly at the start of the first stroke, when the piston is at the first cylinder end, herein called top end, if there is no top end dead space, i.e. the volume of the first cylinder space is zero. The same reasoning applies as well when the piston reaches the second cylinder end, herein called bottom end, where the closing of the first inlet opening and the second outlet opening can occur at the very end of the first stroke when the piston changes direction again. However, to avoid any dead end spaces may be hard in the actual design of the engine. Likewise, other phenomena may also influence the engine such that it is desired to allow the closing and opening of the first inlet opening valve and the second outlet opening valve to deviate from the theoretical optimized timings. However, the first inlet opening valve and the second outlet opening valve shall be open at least during 75% of the stroke length, preferably also during at least 90% of the stroke length, during the first stroke.

Concerning the first outlet opening valve and the second inlet opening valve is the engine designed to have them shut during essentially the same time intervals.

The hot gas engine may further be designed such that
The first inlet valve in said first inlet opening in said first cylinder chamber and said second outlet valve in the second outlet opening of the second cylinder chamber are closed during the major part of a second stroke during which the piston travels from the second to the first end of the cylinder, and During a first phase of said second stroke is the first outlet valve in the first outlet opening in the first cylinder chamber closed while the second inlet valve in the second inlet opening in the second cylinder chamber is open. This means that the heated gas from said heating chamber is allowed to expand into the second cylinder chamber while performing a positive work on the piston. Simultaneously, the gas in the first chamber will be compressed therein during this first phase of the second stroke, and During a second phase of said second stroke is the first outlet valve open while said second inlet valve is closed. This means the gas flow from the heating chamber to the second chamber is cut off and it is only gas comprised in the second chamber which is allowed to expand while performing a work on the piston on its second surface. The gas comprised in the first cylinder chamber will now have a connection to the heating chamber and gas in the first cylinder chamber will be compressed together with the gas comprised in the heating chamber while performing a negative work on the first side of the piston.

As discussed above for the timing of closing of the first inlet valve and the second outlet valve may the engine design deviate from closing these valves exactly at the beginning of the second stroke and opening them exactly at the ending of the second stroke. However, they are preferably closed at least during 80%, preferably during 95%, of the stroke length of the second stroke.

Concerning the first outlet valve and the second inlet valve is the engine designed to operate these valves such that they will essentially have opposed positions during the same time during the second stroke, i.e. when the first outlet valve is closed will the second inlet valve be open and vice versa. Hence, during the first phase of the second stroke will the heated gas from the heating chamber expand and enter into the second cylinder chamber while the air which has been introduced into the first chamber during the first stroke will be compressed. The first of phase of the second stroke could be defined to start when the second inlet valve is opened. This phase will thus correspond to the major net work contribution of the complete working cycle. After a while, the first outlet valve and the second inlet valve will change their respective positions such that the first outlet valve will close and the second inlet valve will open to be in the second phase of the second stroke. The second phase of the second stroke could be defined to start when the first outlet valve is opened. In this phase will thus the gas comprised in the second cylinder chamber only expands within the second chamber while performing a work on both the first piston chamber and the heating chamber. During this phase will there be a negative net work for compressing the gas.

The opening and closing of the first outlet valve and the second inlet valve need not to be made exactly simultaneously but should be made at essentially the same time. Hence, the first outlet valve should be closed and the second inlet valve should be open during at least 80% of the stroke length of the piston during the first phase of the second stroke. Likewise, the first outlet valve should be open and the second inlet valve should be closed during at least 80% of the stroke length of the piston during the second phase of the second stroke.

The hot gas engine may be arranged such that said first and second phase of the second stroke are essentially equal. By essentially is meant that each phase will go on for at least 40% of a full stroke length.

In order to provide an efficient hot gas engine as described above is it desired to avoid pressure shocks. The engine may thus be arranged to not open the first outlet valve of the first outlet opening in the first cylinder chamber at the end of the first phase of the second stroke until the pressure in the heating chamber is essentially equal to the pressure in the first cylinder chamber. In particular, it is desired to avoid open the first outlet valve before the pressure has reached a pressure which is equal to the pressure in the heating chamber in order to avoid a pressure shock in the direction contrary to the movement of the piston. In addition will opening of the first outlet valve before the pressure in the heating chamber and the first cylinder chamber has been equalized contribute to a release energy working in the wrong direction and thus directly produce contradictive work lowering the engine efficiency. Hence, the first outlet valve is preferably not opened until the pressure difference in the heating chamber differs less than 10% from the pressure in the first cylinder chamber and in order to avoid a direct loss of possible productive work should the pressure in the first cylinder chamber be at least equal to the pressure in the heating chamber before it is opened.

Another feature which may improve the performance of the engine is to design the piston to comprise a thermal insulating material in order to decrease heat flow between the first and second chamber. Since the first and second cylinder chambers are only separated by the piston may a thermal insulation reduce heat flow between the chambers which has a negative effect of the engine efficiency.

According to one example, it can be advantageous to have a first cylinder chamber with a smaller maximum volume than the second cylinder chamber. This can be achieved by designing hot gas engine so that the piston rod passes through said cylinder through said first end of the cylinder, and/or by controlling the opening and closing of the valves to control the volume of intake air into the first cylinder chamber. By controlling the volume of the first cylinder chamber it is possible to expand the gas in the second cylinder chamber to a pressure at or near 1 bar (atmospheric pressure), thus increasing the efficiency in accordance with the Atkinson cycle.

The ratio between maximum volumes of the first and second cylinder chambers is preferably 1:1.5 to 1:2, more preferably 1:1.7. This can be achieved by designing the piston rod passing through the first cylinder chamber to take up a volume sufficient for achieving a desired difference in volume.

However, it may not be practical or even possible to use the piston rod only for achieving this purpose. Alternatively, the desired difference in volume can be achieved by using the volume taken up by the piston rod combined with a controlled opening and closing of the first inlet valve. The volume can be controlled by opening the first inlet valve for a predetermined period of time during the first phase of said second stroke during the compression cycle of the first cylinder chamber and expansion cycle of the second cylinder chamber. The first inlet valve can be closed when the enclosed volume of the first cylinder chamber corresponds to the desired maximum volume.

The hot gas engine may also be designed such that the first inlet opening in the first cylinder chamber and the second outlet opening in the second cylinder chamber are connected to each other by a connecting conduit such that the gas flow may form part of a closed system. In case this connection is present could it be possible to provide a pressurized system enabling an increased output from the engine.

If the first inlet opening in the first cylinder chamber and the second outlet opening in the second cylinder chamber are connected to each other by a connecting conduit may heat be removed from the system by the use of a heat exchanger located in the connecting conduit. This heat could for example be used to heat water in a heat water piping system in order to heat a building or the like.

The hot gas engine may further be designed such that the heating chamber is provided with a heat exchanger connected to a heat source in order to deliver heat energy from the heat source to the heating chamber so as to heat the gas in the heating chamber. The heating chamber could also be heated directly by using a desired fuel or be heated by a combination of direct heating by a source in the heating chamber and a heat exchanger. An advantage by using a heat exchanger is that any suitable heat source may be used to power the engine.

The engine could be designed to include one more heating chamber connected to the compression cylinder and expansion cylinder in the same way as the first heating chamber. This could have the benefit of allowing the gas in one chamber to be heated during one cycle while the gas in the other chamber is used for providing the working media to the cylinder. Hence, the engine may be controlled to alternately direct the gas flow between the first heating chamber and second heating chamber.

The hot gas engine may be designed such that the cranking mechanism is mechanically connected to a cam arrangement which provides for the opening and closing control of at least one of the valves. If all the valves are mechanically controlled it may be avoided that any Electronic Control Unit (ECU) is needed to control the engine. However, if an ECU is used for the opening and closing of at least one of the valves it may be easy to change the opening/closing of the valves by re-programming the ECU to change the signals sent to an actuator controlling the valve or valves.

BRIEF DESCRIPTION OF THE DRAWINGS

The subsequent text will be described with reference to the appended drawing figures. These schematic figures are only intended for illustration of a number of embodiments of the invention and are not in any way intended to limit the scope of the invention.

DETAILED DESCRIPTION OF THE DRAWINGS

Figure 1:
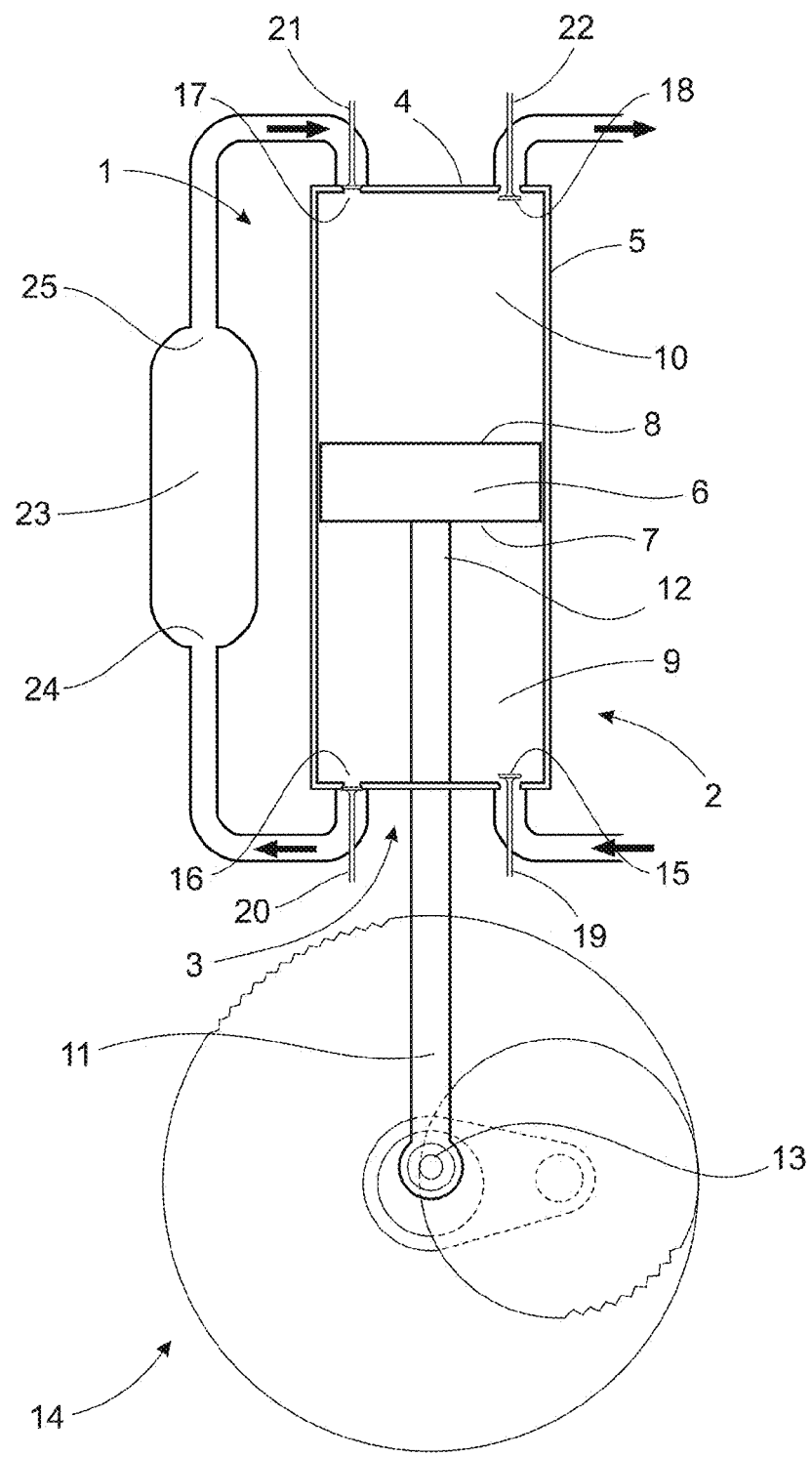
FIG. 1 discloses a schematic view of a hot gas engine according to an embodiment of the invention.

FIG. 1 discloses a hot gas engine 1 comprising a cylinder 2 defining a space within a first end 3 and a second end 4 connected by a longitudinal extending cylinder wall 5 and a piston 6 comprised in the space defined in the cylinder 2. The piston 6 has a first surface 7, facing towards the first end 3 of the cylinder 2, and a second surface 8 facing towards the second end 4 of the cylinder 2. Within the cylinder are thus a first cylinder chamber 9 defined by the first end 3, the longitudinal extending cylinder wall 5 together with the first side 7 of the piston 6 and a second cylinder chamber 10 defined by the second end 4, the longitudinal extending cylinder wall 5 together with the second side 8 of the piston. The piston 8 is connected to a piston rod 11 such that a first end 12 of the piston rod 11 is connected to the piston 6 at its first side 7. A second end 13 of the piston rod 11 is connected to an orbital crankshaft 14. The cylinder 2 is further provided with a first inlet opening 15 and a first outlet opening 16 provided in the first cylinder chamber 9 and a second inlet opening 17 and a second outlet opening 18 comprised in the second cylinder chamber 10. The first inlet opening 15 is provided with a first inlet valve 19, the first outlet opening 16 is provided with a first outlet valve 20, the second inlet opening is provided with a second inlet valve 21 and the second outlet opening 18 is provided with a second outlet valve 22. The hot gas engine 1 further comprises a heating chamber 23 provided with a third inlet opening 24 and a third outlet opening 25. The third inlet opening 24 is connected to the first outlet opening 16 and the third outlet opening 25 is connected to the second inlet opening 17.

FIG. 2A-2E discloses a hot gas engine designed to be controlled to operate according to a first alternative specific working cycle. The operation of such a hot gas engine is as follows, wherein the direction of movement of the piston 6 is indicated by an arrow.

Figure 2A:
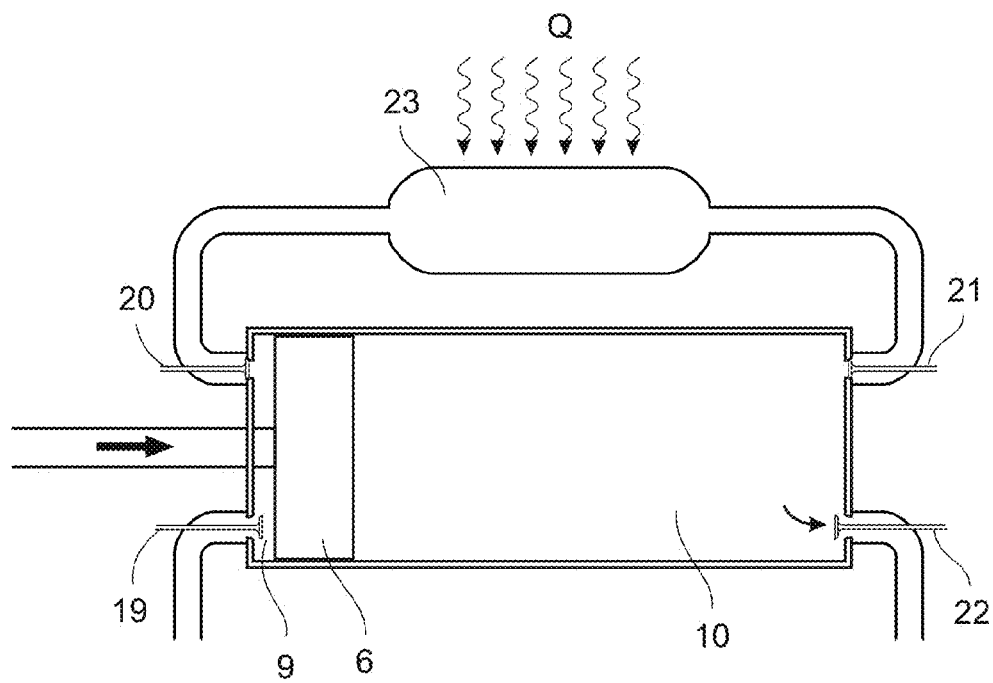
FIG. 2A-2E discloses a hot gas engine designed to be controlled to operate according to a specific working cycle.

In FIG. 2A the piston 6 is at a first end position, or start position, wherein the first inlet valve 19 has been opened to admit fresh air into the first cylinder chamber 9. At the same time, second outlet valve 22 has been opened to allow expulsion of expanded hot gas from the previous cycle from the second cylinder chamber 10. At this time the first outlet valve 20 and the second inlet valve 21 are closed, so that communication with the heating chamber 23 is prevented. The heating chamber 23 forms a closed volume containing gas which has been pressurized to a predetermined first level during the end of a second compression cycle (FIG. 2D-2E). During this combined air intake cycle and gas expulsion cycle (FIG. 2A-2B) the heating chamber 23 receives heat Q at constant volume, in order to increase the pressure to a predetermined second level.

Figure 2B:
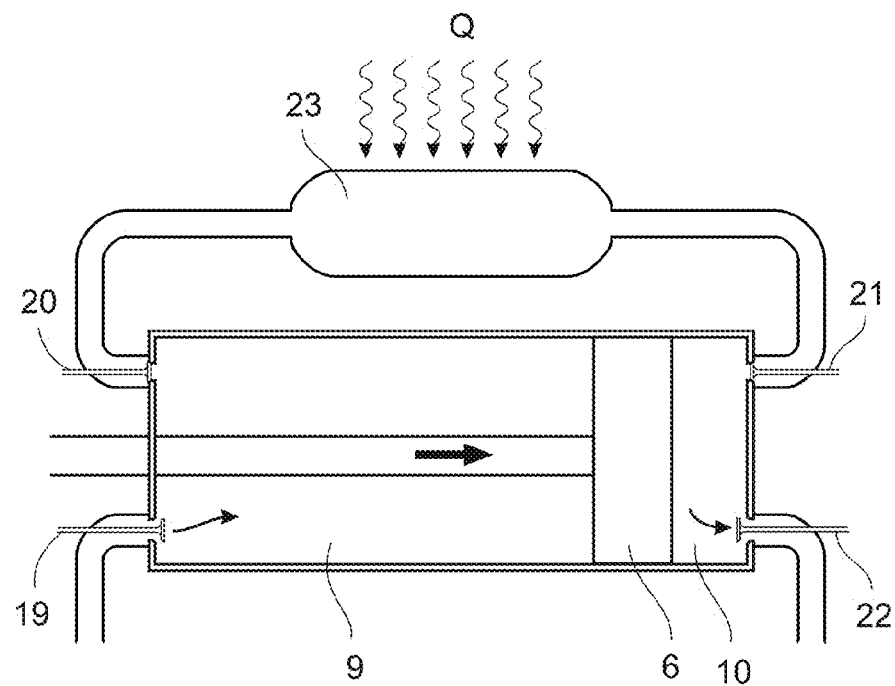

In FIG. 2B the piston 6 is approaching a second end position at the second end of the cylinder, wherein the first inlet valve 19 is open and fresh air has been drawn into the first cylinder chamber 9. At the same time, expanded hot gas from the previous cycle has been expelled from the second cylinder chamber 10 through the open second outlet valve 22. At this time the first outlet valve 20 and the second inlet valve 21 are still closed and the heating chamber 23 continues to receive heat Q at constant volume, as described above. The supply of heat Q to the heating chamber 23 continues until the piston 6 reaches the second end position.

Figure 2C:
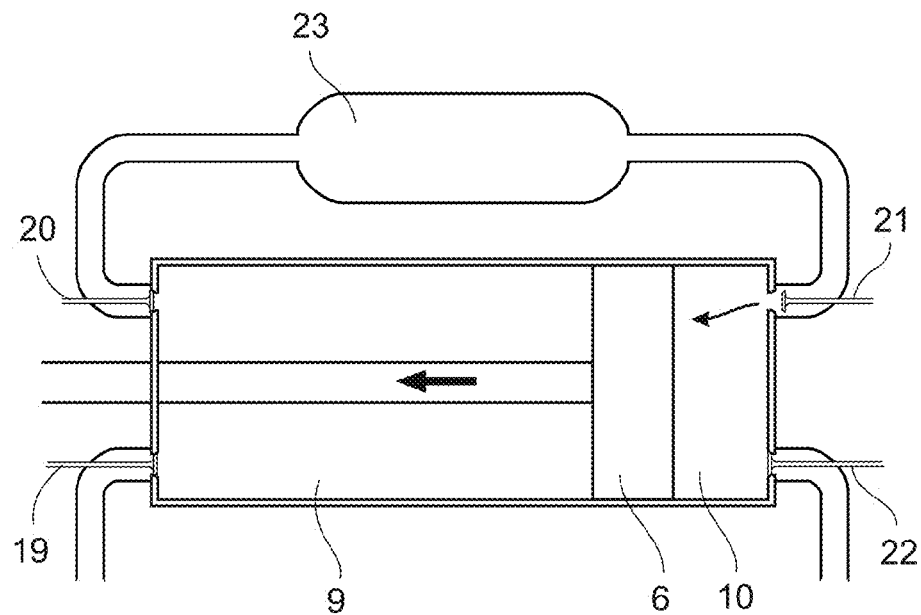
Figure 2D:
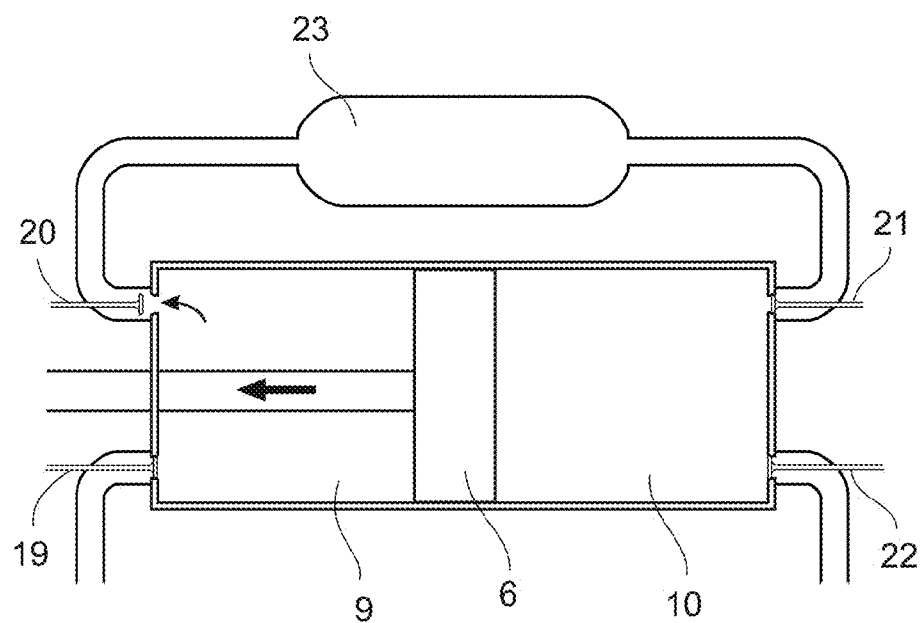
Figure 2E:
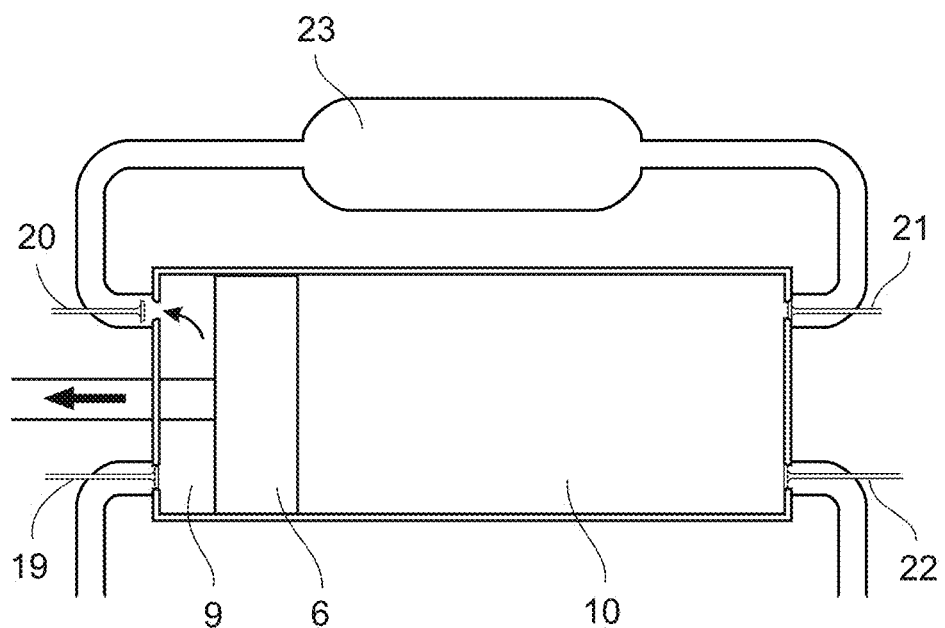

In FIG. 2C the piston 6 has started to return from the second end position, wherein the second inlet valve 21 has been opened to perform an expansion cycle. During a first stage of expansion the heated, pressurized gas in the heating chamber 23 flows into the second cylinder chamber 10 through the second inlet valve 21 to displace the piston 6 towards the first end of the cylinder. The second outlet valve 22 is closed to prevent expulsion of expanding hot gas from the second cylinder chamber 10. At this time the first inlet valve 19 and the first outlet valve 20 are closed to perform a first compression cycle in the first cylinder chamber 9, where the pressure of the intake air is increased from atmospheric towards the first predetermined level.

In FIG. 2D the piston 6 is approximately half-way between the first and the second end positions, moving towards the first end of the cylinder. At this time, the second inlet valve 21 is closed and the second outlet valve 22 remains closed. Hot gas contained into the second cylinder chamber 10 will continue to expand and will contribute to the displacement of the piston 6 as long as the pressure in the second cylinder chamber 10 exceeds that of the first cylinder chamber 9. At this time the first outlet valve 20 is opened to displace intake air into the heating chamber 23. As the piston 6 moves towards the first end of the cylinder, the second compression cycle is initiated to increase the pressure of the intake air to the first predetermined level. The first inlet valve 19 is maintained closed during the second compression cycle to prevent compressed air from escaping out of the first cylinder chamber 9 into the atmosphere.

In FIG. 2E the piston 6 is approaching the first end position at the first end of the cylinder. The first outlet valve 20 is still open as the pressure in the heating chamber 23 increases towards the first predetermined level. The first inlet valve 19 is maintained closed during the second compression cycle. At this time, the second inlet valve 21 and the second outlet valve 22 remain closed. Once the piston 6 has reached the first end position a new combined air intake cycle and gas expulsion cycle is started (FIG. 2A).

In order to increase the efficiency of the engine in accordance with the Atkinson cycle it can be advantageous to have a first cylinder chamber with a smaller maximum volume than the second cylinder chamber.

This can be achieved by designing hot gas engine so that the piston rod passes through said cylinder through said first end of the cylinder and/or by controlling the opening and closing of the valves to control the volume of intake air into the first cylinder chamber 9. By controlling the volume of the first cylinder chamber 9 it is possible to expand the gas in the second cylinder chamber 10 to a pressure at or near 1 bar (atmospheric pressure). The ratio between the first and second cylinder chambers is preferably 1:1.5 to 1:2, more preferably 1:1.7. This can be achieved by designing the piston rod passing through the first cylinder chamber to take up a volume sufficient for achieving a desired difference in volume.

According to a further example, the hot gas engine in FIG. 2A-2E can be designed to be controlled to operate according to an alternative specific working cycle. In this working cycle, the difference in volume is achieved by using the volume taken up by the piston rod 11 combined with a controlled opening and closing of the first inlet valve 19 (FIG. 1). The volume can be controlled by opening the first inlet valve 19 for a predetermined period of time during the first phase of the second stroke during the compression cycle of the first cylinder chamber 9 and expansion cycle of the second cylinder chamber 10. This part of the second working cycle is illustrated in FIG. 2C, where the first inlet valve 19 is closed when the volume of the first cylinder chamber 9 reaches a predetermined value. The first inlet valve 19 is closed when the enclosed maximum volume of the second cylinder chamber 10, as schematically shown in FIG. 2A, is 1.5 to 2 times the volume of the first cylinder chamber 9, as schematically shown in FIG. 2C. The selected maximum volume of the first cylinder chamber is dependent on the desired level of expansion of the gas in the second cylinder chamber and the volume taken up by the piston rod at the time of closing of the first inlet valve 19.

Figure 3:
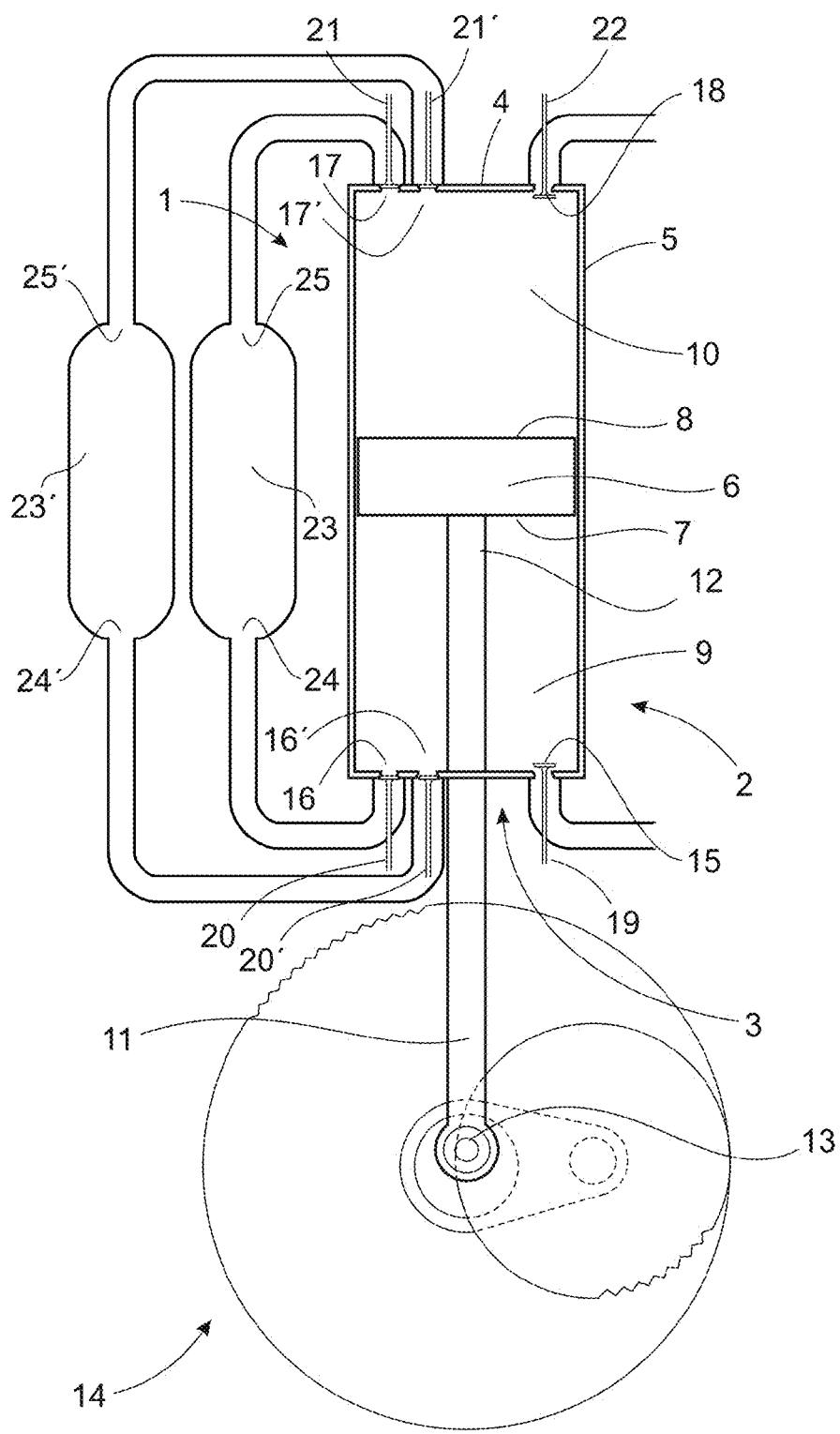
FIG. 3 discloses an engine which has been provided with an additional heating chamber.

FIG. 3 shows an embodiment of the hot gas engine based on the engine shown in FIG. 1. The embodiment in FIG. 3 uses the same reference numbers for those component parts which are the same as in FIG. 1. The alternative hot gas engine in FIG. 3 comprises an additional heating chamber 23' in addition to the heating chamber 23 described in connection with FIG. 1. The embodiment shown in FIG. 3 is described using the same reference numerals for component parts which are identical to the embodiment in FIG. 1.

The first heating chamber 23 is provided with a third inlet opening 24 and a third outlet opening 25 connected to a third inlet opening 24 and a third outlet opening 25, respectively, as previously described in connection with FIG. 1 above.

The second heating chamber 23' is provided with a fourth inlet opening 24' and a fourth outlet opening 25'. The fourth inlet opening 24' is connected to a fifth outlet opening 16' and the fourth outlet opening 25' is connected to a fifth inlet opening 17'. The fifth outlet opening 16' is arranged adjacent the first outlet opening 16, while the fifth inlet opening 17' is arranged adjacent the first inlet opening 17. Similarly, the fifth outlet opening 16' is provided with a third outlet valve 20' and the fifth inlet opening 17' is provided with a third inlet valve 21'.

During operation, the first outlet valve 20 and the fifth outlet valve 20' will open alternately every second compression cycle. Similarly, the second inlet valve 21 and the fifth inlet valve 21' will open alternately every second expansion cycle.

During an initial cycle, when the second heating chamber 23' forms a closed volume which is being heated, the hot gas in the first heating chamber 23 will be used for powering the heat engine. During this initial cycle a combined air intake cycle and gas expulsion cycle is carried out, as described in connection with FIGS. 2A-2B. During the expansion cycle carried out in the initial cycle, pressurized gas in the first heating chamber 23 flows into the second cylinder chamber 10 through the second inlet valve 21 to displace the piston 6 towards the first end of the cylinder. During the compression cycle carried out in the initial cycle, the first outlet valve 20 is opened to displace intake air into the first heating chamber 23. Hence, for the initial cycle, the gas flow through the engine may be performed as described in connection with FIGS. 2A-2E above. The second heating chamber 23' remains closed and is heated continuously during the entire initial cycle, comprising the said combined air intake and gas expulsion cycle, as well as during the expansion and compression cycle.

After this initial cycle is ended, a subsequent cycle is initiated. During the subsequent cycle, when the first heating chamber 23 forms a closed volume which is being heated, the hot gas in the second heating chamber 23' will be used for powering the heat engine.

During the subsequent cycle the combined air intake cycle and gas expulsion cycle is carried out, as described in connection with FIGS. 2A-2B. During the expansion cycle carried out in the subsequent cycle, pressurized gas in the second heating chamber 23' flows into the second cylinder chamber 10 through the third inlet valve 21' to displace the piston 6 towards the first end of the cylinder. During the compression cycle carried out in the subsequent cycle, the third outlet valve 20' is opened to displace intake air into the second heating chamber 23'. Hence, for the subsequent cycle, the gas flow through the engine may be performed as described in connection with FIGS. 2A-2E above. The first heating chamber 23 remains closed and is heated continuously during the entire subsequent cycle, comprising the said combined air intake and gas expulsion cycle, as well as during the expansion and compression cycle.

Hence, the engine may be controlled essentially the same way as previously described but with the exception that the use of two heating chambers allows gas entrapped in either of the heating chambers to be heated for an extended period time every alternate cycle. Instead of being heated only during the combined air intake and gas expulsion cycle, each heating chamber can be heated, in turn, during a subsequent complete cycle (expansion and compression cycle/air intake and gas expulsion cycle) when the other heating chamber is used for driving the engine. In this example, the heating chambers can be heated alternately for a period of time corresponding to a reciprocating movement of 360+180 degrees, i.e. for one and a half complete cycles, before the gas in the respective heating chamber is used for powering the heat engine.

Further heating chambers could of course be added to the hot gas engine. If for example three heating chambers were used, then they could be controlled so that each chamber is used every third cycle. This would allow gas contained in a heating chamber to be heated for a period of time corresponding to a reciprocating movement of 360+360+180 degrees, i.e. for two and a half cycles, before the gas in that heating chamber is used for powering the hot gas engine.

Figure 4:
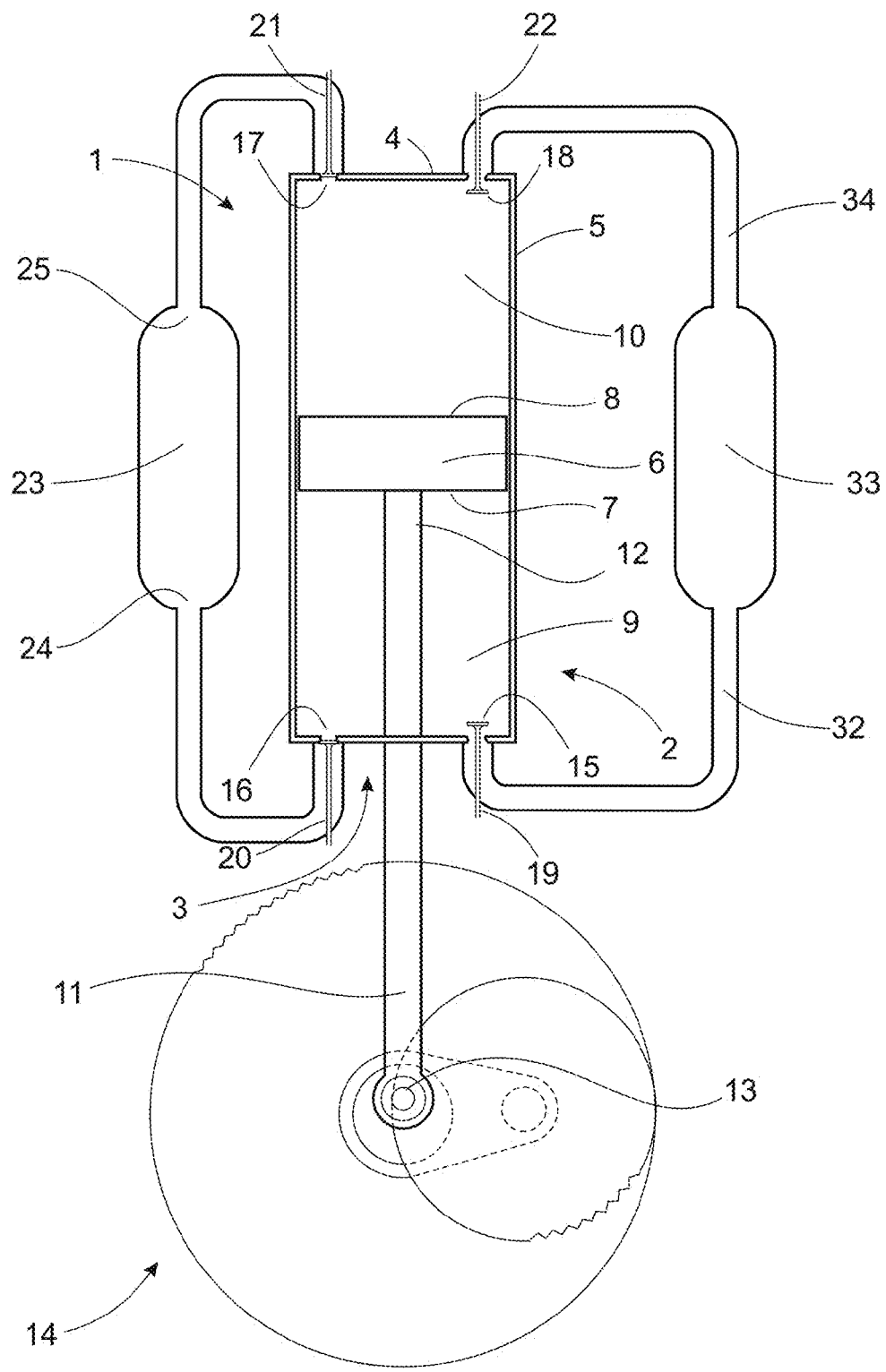
FIG. 4 discloses a hot gas engine which has been provided with a heat exchanger to f remove heat.

FIG. 4 shows an embodiment of a hot gas engine based on the engine shown in FIG. 1. The embodiment in FIG. 4 uses the same reference numbers for those component parts which are the same as in FIG. 1. The alternative hot gas engine in FIG. 4 allows a high pressure mode achieved to be by connecting conduits 32, 34 between the second outlet opening 18 and the first inlet opening 15 in which the connecting conduit also is provided with a heat exchanger 33 to f remove heat. A closed loop will then be established where the heat contained in the gas expelled from the second cylinder chamber 10 through the second outlet opening 18 into a first connecting conduit 32 after the expansion cycle can be removed in the heat exchanger 33 and may be used for heating of hot water etc. When the heat has been removed, the gas flows into a second connecting conduit 34 before re-entering the first cylinder chamber 9 through the first inlet opening 15.

By creating a closed loop system will it be possible to regulate the internal pressure in the system and the output power will be proportional to the base pressure established. For instance, by using a start pressure of 2 bar instead of 1 bar (atmospheric pressure), it is possible to increase all pressures during a working cycle by a factor 2 and thus increase the energy production by a factor 2.

To minimize any leakage out of the system, the entire engine, including its crankcase may be kept under overpressure with the same pressure as is used in the system before the air enters the inlet valve of the compression cylinder which is the lowest pressure present during the working cycle. The pressure in the system could be kept constant by a compressor sensing the pressure in the system and starting to refill air when the pressure in the system drops below a preset value.

Figure 5:
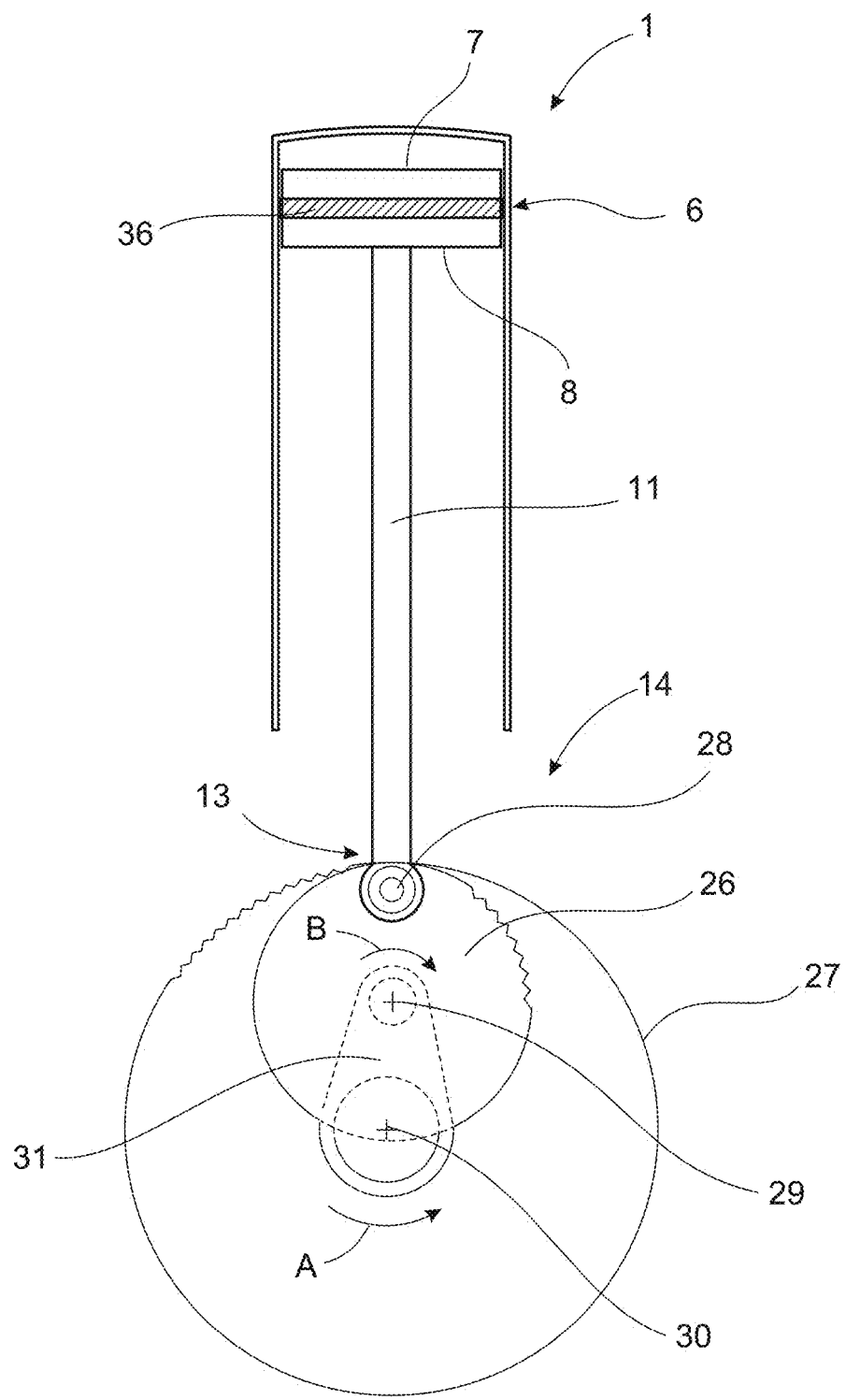
FIG. 5 discloses a schematic illustration of an orbital cranking mechanism for converting reciprocating piston movement to a rotary movement.

FIG. 5 discloses a schematic illustration of the orbital crankshaft mechanism which converts the reciprocating piston movement to a rotary movement. FIG. 5 represents the orbital crankshaft in the top of stroke position, with the piston 6 adjacent the second end of the cylinder (see FIG. 1), which position will be considered as 180° of crankshaft rotation. The minor circle represents a gear wheel 26 which at this point of crankshaft rotation is seen abutting the top of the major circle which represents a fixed outer toothed circle or gear 27 within which the gear wheel 26 runs. A crankshaft 30 is arranged to rotate about a rotational axis at the centre of the outer toothed circle or gear 27. The crankshaft 30 is provided with a crank 31 having an axis 29 at its radially outer end, about which the gear wheel 26 turns as runs in orbit around the outer toothed gear 27. The second end 13 of the piston rod 11 is connected at an attachment point 28 at the outer periphery of the gear wheel 26.

In operation the gear wheel 26 runs around the outer toothed gear 27 in a circular orbital motion centred on the axis of crankshaft 30. In FIG. 5, the crankshaft 30 rotates anti-clockwise, as indicated by an arrow A. The gear wheel 26 is mounted onto the crank 31 of the crankshaft 30 at a rotational axis 29 and rotates clockwise about this axis 29, indicated by an arrow B, as it rolls around the inner periphery of the outer toothed gear 27.

The linear motion is joined to the wheel at the rotational axis represented by circle 6. It is at this point that the piston generated linear force impels the wheel to run in an orbital motion around the track. In FIG. 5 the linear mechanical elements are represented by a piston/rod assembly 7, which is made to resemble the piston and connecting rod of a conventional crankshaft.

The radius of the pitch circle of the gear wheel 26 is exactly half of the radius of the pitch circle of the outer toothed gear 27. The offset distance between the centre of the crankshaft axis and the rotational axis 29 of the gear wheel 26 on the crank 31 corresponds exactly to the radius of the gear wheel 26. Similarly, the offset distance between the rotational axis 29 and the attachment point 28 of the piston rod 11 is exactly equal to the radius of the pitch circle of the gear wheel 26. Hence, the attachment point 28 located on the pitch circle of the gear wheel 26.

The use of an orbital crankshaft mechanism eliminates any side loads on the piston, as the piston rod travels in a straight line relative to the cylinder. Consequently, any piston rings or seals on the piston 6 do not need to be dimensioned for withstanding side loads, but are only required to provide a sufficient seal between the first and the second cylinder chambers 9, 10 (FIG. 1). This means that, for instance, the piston ring tension can be reduced significantly and allows the piston to be moved in the cylinder with significantly reduced frictional resistance. The reduced friction loss will help to increase the overall efficiency of the engine.

The advantages of an orbital crankshaft mechanism is also explained in CA 2,213,044 and is described in comparison with a normal crankshaft therein (See FIGS. 5 to 9 described on pages 8 to 12 in CA 2,213,044). In the following figures is it intended to describe the specific benefits of using such an orbital crankshaft mechanism for a dual cylinder chamber engine.

Figure 6:
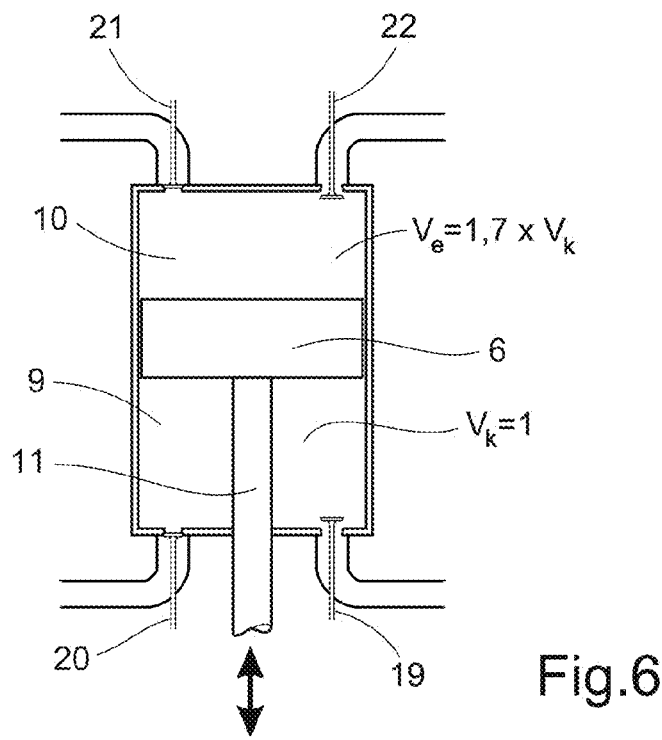
FIG. 6 discloses a cross sectional view of a cylinder

In FIG. 6 is the dual cylinder chamber shown wherein first cylinder chamber 9, the so called compression chamber, has a volume $V_k$. The second cylinder chamber 10, the so called expansion chamber, has a volume $V_e$ which is 1.7 times larger than $V_k$, i.e. $V_e=1.7\ V_k$. The difference in volume is caused by the piston rod 11 which by being selected to have appropriate dimensions reduces the volume of the first cylinder chamber 9 to a desired extent. The first cylinder chamber is provided as earlier described with the first inlet valve 19 and the first outlet valve 20 while the second cylinder chamber 10 is provided with the second inlet valve 21 and the second outlet valve 22.

Figure 7A:
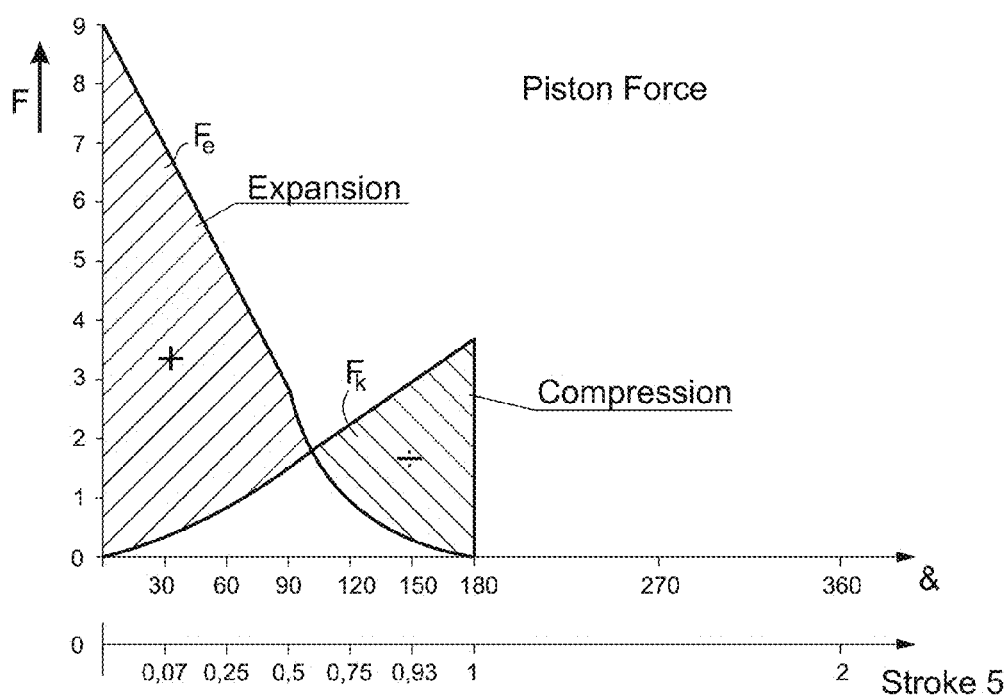
FIG. 7 discloses diagram of the forces from the piston (FIG. 7a) as well as the tangential forces of the orbital cranking mechanism (FIG. 7b) as a function of the cranking angle FIG. 8 discloses a schematic drawing on the forces acting on the cranking mechanism FIG. 9 discloses the tangential torque on the cranking mechanism at different crank angles

In the graph in FIG. 7a is described generally how the forces are working on the piston 6 when the dual cylinder chamber engine is controlled as previously described herein. The positive work from the second cylinder chamber 9 (the expansion chamber) is illustrated by graph $F_e$ and the negative work for compressing the gas in the first cylinder chamber 10 (the compression chamber) is illustrated by graph $F_k$. The resulting force from the piston, the piston force, will thus be $F_e-F_k$. As may be readily understood from this figure will there be a positive work from the piston 6 during the first part of the first stroke, for about 0 to 100 degrees crank angle α where Fe>Fk. From a crank angle α from around 100 to 180 will there be a slight negative work on the piston while ideally no forces at all will act on the piston during the second stroke, i.e. during a crank angle α from around 180 to 360 when the first inlet valve 19 and second outlet valve 22 are open and the first outlet valve 20 and second inlet valve 21 are closed such that a gas volume comprised in a heating chamber 23 may be heated at constant volume. There must of course be some feature connected to the cranking mechanism, e.g. an attached power consuming device, a fly wheel or possibly the gear wheel itself, which provides for a continued motion of the piston towards the end point at the bottom since there is a net negative force working on the piston during the later stage of the first stroke and the second stroke when there are essentially no forces at all from the cylinder chambers working on the piston.

The axle below the graph is indicating the corresponding (linear) stroke position of the piston rod 11 as function of the crank angle α.

Figure 7B:
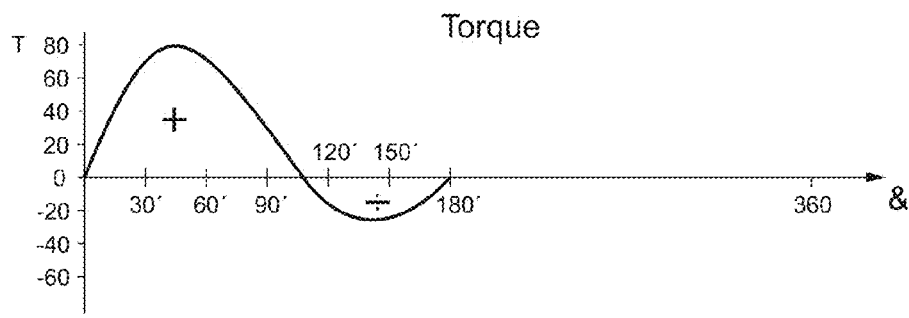
Figure 8:
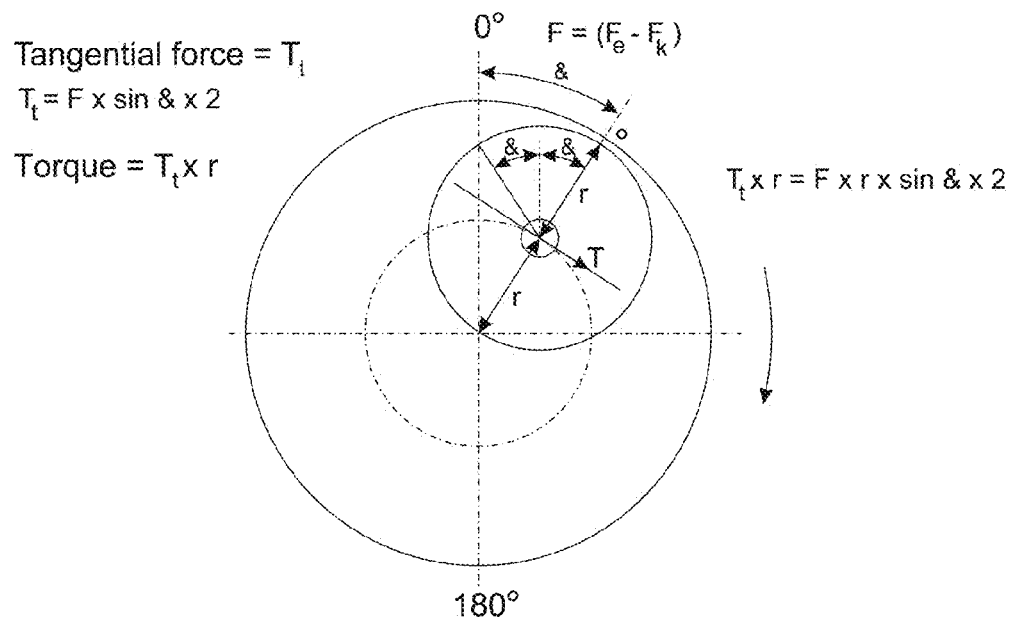
Figure 9A:
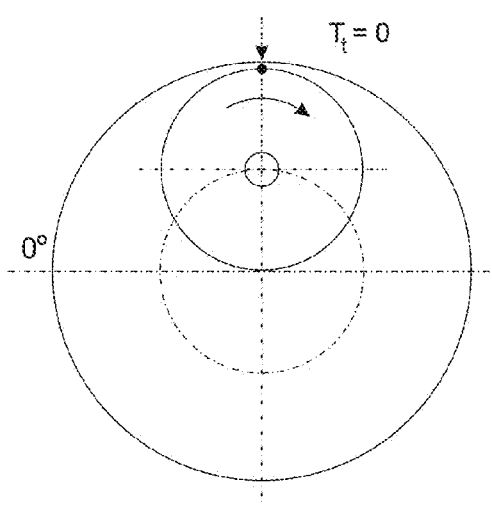
Figure 9B:
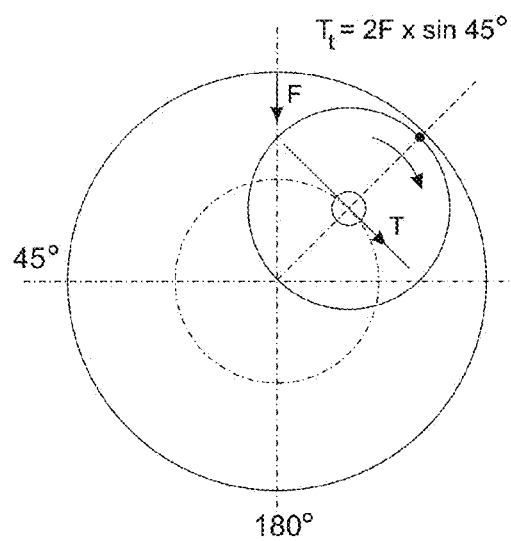
Figure 9C:
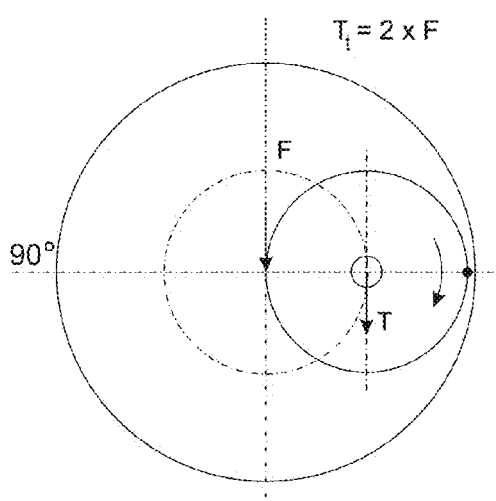
Figure 9D:
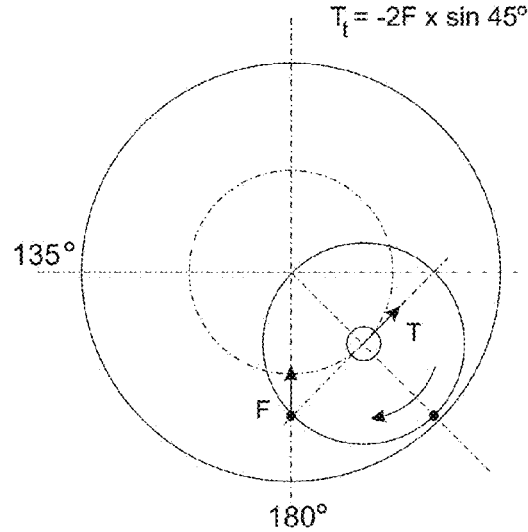

In FIG. 7b is the torque, T, of the cranking mechanism shown as function of crank angle α. The torque T may be calculated using the formula $$T=T_t*r=F*\sin \alpha *2*r$$

wherein $T_t$ is the tangential torque, r is the radius of the gear wheel, F is the piston force and α the crank angle. The basis for the calculations may be best understood from FIG. 8, disclosing the parameters used for calculating the torque, and FIG. 9 which exemplifies the value of tangential torque for a crank angle α of 0, 45, 90 and 135 degrees in FIGS. 9a to 9d.

As may be understood from maybe best from the graphs of FIGS. 7a and 7b will the torque T at the peak pressure (at crank angle α=0), and thus at maximum piston force, be reduced due to the orbital arrangement. As the pressure difference of the cylinder chambers is reduced while the crank angle increases will the torque T increase to be at its maximum around a crank angle of 45 degrees. Hence, the dual chamber concept it will make it possible to "smoothen" wearing forces working on the cranking mechanism and make the cranking mechanism to last longer and thus making it possible to use the orbital cranking mechanism commercially. In an ordinary internal combustion engine will the peak pressure usually be somewhere between 30 and 120 degrees and thus a peak pressure while the tangential force is larger. The use of the engine described herein thus make it possible to provide a long lasting orbital cranking mechanism which will provide the benefit of a piston engine with very low friction losses compared to engines provided with a common cranking mechanism.

In order to reduce losses further, the piston 6 can be provided with a layer 31 of heat insulating material between its first and second sides 7, 8. This will reduce the heat transfer between the relatively cold first cylinder chamber 9 and the relatively hot second cylinder chamber 10, which will increase the thermal efficiency of the engine.

As is obvious to the skilled person in the art, the inclusion of a closed loop system could of course also be used for the embodiment of the invention shown in FIG. 3, wherein the hot gas engine comprises two heating chambers. Since the parts to be modified are the same as for an engine comprising only one heating chamber, no specific adaptation is required to include the closed loop feature for a hot gas engine with multiple heating chambers.

The embodiments of the invention described only serves as an example of the invention and the hot gas engine according to the invention may be realized in a many alternative embodiments. For instance, the number of compression/expansion cylinders connected to a heating chamber can be more than one, the relative volumes of the first and the second cylinder chambers and/or the heating chamber (or heating chambers) may vary. The control of the valves may also be different (mechanical/hydraulic/electric actuation) and the timing of the closing and opening of the valves may be variable while still providing essentially the same working cycle. It is of course also possible to provide a larger energy producing entity by connecting several engines in parallel or in series to generate a higher torque, allowing a larger quantity of electricity to be produced. The same cranking mechanism can be used for a set of engines connected to the same crankshaft to provide a single unit, which can be part of an electricity producing unit.

The invention claimed is:

1. A hot gas engine (1) comprising:
   a cylinder (2) extending in a longitudinal direction having a first end (3), a second end (4) and a longitudinal extending wall (5) between said first and second ends (3, 4) thereby defining a cylinder space, said cylinder (2) further provided with inlet (15, 17) and outlet (16, 18) openings for a working fluid to enter into and to be exhausted from said cylinder (2);
   a piston (6) located within said cylinder (2), said piston (6) adapted to be able to move back and forth within said cylinder (2) in the longitudinal direction and having a first surface (7) facing said first end (3) of said cylinder (2) thereby defining together with the longitudinal extending cylinder wall (5) a first cylinder chamber (9) within the cylinder (2), said piston (6) further having a second surface (8) facing the second end (4) of said cylinder (2) thereby defining together with the cylinder wall (5) a second cylinder chamber (10) within the cylinder; and
   a piston rod (11) having a first end (12) and a second end (13) wherein said first end (12) is connected to said piston (6), said piston rod (11) passing through said cylinder (2) through either said first or second end (3, 4) of the cylinder (2),
   wherein said first cylinder chamber (9) comprises a first inlet opening (15) provided with a first inlet valve (19) and a first outlet opening (16) provided with a first outlet valve (20),
   wherein said second cylinder chamber (10) comprises a second inlet opening (17) provided with a second inlet valve (21) and a second outlet opening (18) provided with a second outlet valve (22),
   wherein said first outlet opening (16) in the first cylinder space (9) is connected to said second inlet opening (17) in the second cylinder space (10) so as to allow a flow of working fluid from said first cylinder chamber (9) to said second cylinder chamber (10), wherein said engine (1) comprises an external heating chamber (23) connected by a third inlet opening (24) in the heating chamber (23) to said first outlet opening (16) in the first cylinder space (9) and a third outlet opening (25) in the heating chamber (23) is connected to said second inlet opening (17) in the second cylinder space (10) so as to allow a flow of working fluid from said first cylinder chamber (9) to said second cylinder chamber (10) via said heating chamber (23), wherein said engine (1) is designed to transfer work from the piston rod (11) by an essentially only rectilinear movement of the piston rod (11), wherein the ratio between the maximum volume of the first cylinder chamber (9) and the maximum volume of the second cylinder chamber (10) is selected between 1:1.5 and 1:2, wherein said heating chamber (23) is provided with a burner for heating gases in the heating chamber (23), the burner being located within the heating chamber (23), the burner combusting a fuel in the heating chamber thereby producing combustion products that form part of the flow of working fluid from said first cylinder chamber (9) to said second cylinder chamber (10), the heating chamber being free of any heat exchanger, wherein said hot gas engine (1) is arranged such that during a major part of a first stroke during which the piston (6) travels from the first end (3) of the cylinder (2) to the second end (4) of the cylinder (2) the valves (19, 20, 21, 22) are controlled such that i) said first inlet valve (19) in the first inlet opening (15) in the first piston chamber (9) and said second outlet valve (22) in the second outlet opening (18) in the second cylinder chamber (10) are open, and ii) said first outlet valve (20) in said first outlet opening (16) in said first cylinder chamber (9) and said second inlet valve (21) in said second inlet opening (17) in said second cylinder chamber (10) are closed in order to provide for a constant volume heating of the gas comprised in the heating chamber (23) while essentially no work is performed on or by the piston (6), wherein said hot gas engine (1) is further arranged such that i) said first inlet valve (19) in said first inlet opening (15) in said first cylinder chamber (9) and said second outlet valve (22) in said second outlet opening (18) of the second cylinder chamber (10) are closed during a major part of a second stroke during which the piston (6) moves from the second end (4) to the first end (3) of the cylinder (2), ii) during a first phase of said second stroke, said first outlet valve (20) in said first outlet opening (16) in said first cylinder chamber (9) is closed while said second inlet valve (21) in said second inlet opening (17) in said second cylinder chamber (10) is open thus allowing the heated gas from said heating chamber (23) to expand into the second cylinder chamber (10) while performing a positive work on the piston (6) such that the gas in the first chamber (9) will be compressed, and iii) during a second phase of said second stroke said first outlet valve (20) in said first outlet opening (16) in said first cylinder chamber (9) is open while said second inlet valve (21) in said second inlet opening (17) in said second cylinder chamber (10) is closed thus allowing the gas in the second chamber (10) to expand only within the second chamber (10) while the gas comprised in the first cylinder chamber (9) is compressed together with the gas comprised in the heating chamber (23) while performing a negative work on the piston (6).

2. The hot gas engine (1) according to claim 1, wherein said piston rod (11) is designed to not bend more than 5 degrees when the piston is moving up and down during a cycle.

3. The hot gas engine (1) according to claim 2, wherein said piston rod (11) is connected to an orbital cranking mechanism (14), said orbital cranking mechanism having a first inner gear wheel (26) and a second outer gearwheel (27) arranged such that the inner gear wheel (26) will rotate one round when moving half the round on the inner side of the outer gear wheel (27), said piston rod attached to the gear wheel by a pivotal connection (28) at an attachment point to the first inner gear wheel such that the piston rod (11) will perform a rectilinear motion while moving back and forth while the centre (29) of the inner gearwheel (26) will perform a circular motion.

4. The hot gas engine (1) according to claim 1, wherein said hot gas engine (1) is arranged such that during the first phase of said second stroke said first inlet valve (19) in said first inlet opening (15) in said first cylinder chamber (9) is opened, until the volume of the first cylinder chamber 9 reaches a predetermined value.

5. The hot gas engine (1) according to claim 1, wherein said engine (1) is arranged such that said first and second phase of the second stroke corresponds to an essentially equal stroke length.

6. The hot gas engine (1) according to claim 5, wherein said engine (4) is arranged to not open the first outlet valve (20) of the first outlet opening (16) in the first cylinder chamber (9) at the end of the first phase of the second stroke until the pressure in the heating chamber (23) is essentially equal to the pressure in the first cylinder pressure (9).

7. The hot gas engine (1) according to claim 1, wherein said piston (6) comprises a thermal insulating material (31) in order to decrease heat flow between the first (9) and second (10) cylinder chambers.

8. The hot gas engine (1) according to claim 1, wherein said piston rod (11) passes through said cylinder (2) through said first end (3) of the cylinder (2).

9. The hot gas engine (1) according to claim 1, wherein said first inlet opening (15) in the first cylinder chamber (9) and said second outlet opening (19) in the second cylinder chamber (10) are connected to each other by a connecting conduit (32, 34) such that the gas flow may form part of a closed system.

10. The hot gas engine (1) according to claim 9, wherein heat is removed from the system by a heat exchanger (33) located in the connecting conduit (32, 34).

11. The hot gas engine (1) according to claim 1, wherein there is at least one additional heating chamber (23') connected to the cylinder via an additional outlet opening (16') in the first cylinder chamber (9) having an additional outlet valve (20') connected to an additional inlet opening (24') in the additional heating chamber (23') and an additional outlet opening (25') in the additional heating chamber (23') is connected to an additional inlet opening (17') having an additional inlet valve (21') in the second cylinder chamber (10).

12. The hot gas engine (1) according to claim 11, wherein said engine (1) is controlled to alternately direct the gas flow between the first heating chamber (23) and the additional heating chamber (23').

13. The hot gas engine according to claim 3, wherein the cranking mechanism (14) is mechanically connected to a cam arrangement which provides for the opening and closing control of at least one of the valves (19, 20, 20', 21, 21', 22).

14. The hot gas engine according to claim 1, wherein the opening and closing of at least one of the valves (19, 20, 20', 21, 21', 22) is controlled by an electronic control unit (ECU) which, by sending a signal to an actuator connected to the at least one valve (19, 20, 20', 21, 21', 22) controls the valve.

15. The hot gas engine (1) according to claim 4, wherein said engine (1) is arranged such that said first and second phase of the second stroke corresponds to an essentially equal stroke length.

16. The hot gas engine (1) according to claim 15, wherein said engine (4) is arranged to not open the first outlet valve (20) of the first outlet opening (16) in the first cylinder chamber (9) at the end of the first phase of the second stroke until the pressure in the heating chamber (23) is essentially equal to the pressure in the first cylinder pressure (9).

17. The hot gas engine (1) according to claim 1, wherein said piston rod (11) is designed to not bend less than 2 degrees when the piston is moving up and down during a cycle.

18. The hot gas engine (1) according to claim 1, wherein said piston rod (11) is designed to not bend less than 1 degree when the piston is moving up and down during a cycle.

19. The hot gas engine (1) according to claim 5, wherein said engine (4) is arranged to not open the first outlet valve (20) of the first outlet opening (16) in the first cylinder chamber (9) at the end of the first phase of the second stroke until the pressure in the heating chamber (23) differs less than 10 percent from the pressure in the first cylinder chamber (9).

20. The hot gas engine (1) according to claim 15, wherein said engine (4) is arranged to not open the first outlet valve (20) of the first outlet opening (16) in the first cylinder chamber (9) at the end of the first phase of the second stroke until the pressure in the heating chamber (23) differs less than 10 percent from the pressure in the first cylinder chamber (9).

* * * * *